(12) United States Patent
Kowalewski et al.

(10) Patent No.: US 9,166,827 B2
(45) Date of Patent: *Oct. 20, 2015

(54) CHANNEL ESTIMATE PREDICTED FROM SEVERAL PREVIOUS CHANNEL ESTIMATES, FOR PRE-EQUALIZATION

(71) Applicant: IPCOM GMBH & CO. KG, Pullach (DE)

(72) Inventors: Frank Kowalewski, Salzgitter (DE); Peter Mangold, Hannover (DE)

(73) Assignee: IPCOM GMBH & CO. KG, Pullach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/451,007

(22) Filed: Aug. 4, 2014

(65) Prior Publication Data

US 2014/0349590 A1    Nov. 27, 2014

Related U.S. Application Data

(63) Continuation of application No. 10/380,583, filed as application No. PCT/DE00/03604 on Oct. 13, 2000, now Pat. No. 8,831,130.

(30) Foreign Application Priority Data

Oct. 16, 1999    (DE) .................................. 199 50 021

(51) Int. Cl.
*H04B 1/38*    (2015.01)
*H04L 25/02*    (2006.01)
*H04L 25/03*    (2006.01)
*H04B 1/7103*    (2011.01)

(52) U.S. Cl.
CPC .......... *H04L 25/0202* (2013.01); *H04B 1/7103* (2013.01); *H04L 25/0232* (2013.01); *H04L 25/03343* (2013.01); *H04B 2201/709709* (2013.01)

(58) Field of Classification Search
None
See application file for complete search history.

(56) References Cited

U.S. PATENT DOCUMENTS 3,593,041 A    7/1971    Labarre
4,995,057 A *  2/1991    Chung .......................... 375/231
5,432,816 A    7/1995    Gozzo
(Continued)

FOREIGN PATENT DOCUMENTS

DE    4140742 A1    6/1993
DE    19623665 C1    4/1997
(Continued)

OTHER PUBLICATIONS

Bosch, "Summary of Joint Predistortion," TSG-RAN Working Group1 meeting #3, TSGR1#3(99)156, 4 pages (19999).
(Continued)

*Primary Examiner* — Adolf Dsouza
(74) *Attorney, Agent, or Firm* — Nelson Mullins Riley & Scarborough LLP

(57) ABSTRACT

A data transmission method includes transmitting an encoded data signal in form of a data stream of data bursts between a transmitter and a receiver, making a decision as a function of at least one data transmission parameter as to whether an interference treatment of the data signal to be transmitted will be performed in the transmitter or in the receiver, performing the interference treatment in terms of at least on code in the transmitter, and performing the interference treatment of the data to be transmitted in terms of at least one further code in the receiver.

11 Claims, 2 Drawing Sheets

(56) References Cited

U.S. PATENT DOCUMENTS

| | | | |
|---|---|---|---|
| 5,499,272 | A | 3/1996 | Bottomley |
| 5,761,237 | A | 6/1998 | Petersen et al. |
| 5,905,946 | A | 5/1999 | Lilleberg et al. |
| 6,243,425 | B1 | 6/2001 | Langberg et al. |
| 2002/0114297 | A1* | 8/2002 | Karna et al. .................. 370/335 |

FOREIGN PATENT DOCUMENTS

| | | | |
|---|---|---|---|
| DE | 19747457 | C2 | 4/1999 |
| DE | 19747369 | A1 | 5/1999 |
| DE | 19818215 | A1 | 11/1999 |
| DE | 69325201 | T2 | 11/1999 |
| DE | 19909921 | A1 | 9/2000 |
| EP | 0564937 | B1 | 10/1993 |
| JP | 4-2226 | | 1/1992 |
| WO | 95/02297 | A1 | 1/1995 |
| WO | 99/05807 | A1 | 2/1999 |

OTHER PUBLICATIONS

Bosch, "Tx Diversity with Joint Predistortion," TSG-RAN Working Group 1 Meeting No. 6, TSGR1#6(99)918, 9 pages (1999).

Esmailzadeh, Riaz et al., "Pre-RAKE Diversity Combination for Direct Sequence Spread Spectrum Communications Systems," IEEE International Conference on Communications, pp. 463-467 (1993).

Esmailzadeh, Riaz et al., "Pre-RAKE Diversity Combination for Direct Sequence Spread Spectrum Mobile Communications Systems," IEICE Trans. Commun. vol. E76-B(8):1008-1015 (1993).

Jeong, Dong Geun et al., "Effects of Channel Estimation Error in MC-CDMA/TDD Systems," 2000 IEEE 51st Vehicular Technology Conference Proceedings, VCT 2000, vol. 3:1773-1777 (2000).

Klein, Anja et al., "Zero Forcing and Minimum Mean-Square-Error Equalization for Multiuser Detection in Code-Division Multiple-Access Channels," IEEE Transactions on Vehicular Technology, vol. 45(3):276-287 (1996).

Siemens AG, "Comments on Joint Predistortion," 3GPP TSG RAN WG1, TSGR1#9(99)106, 3 pages (1999).

* cited by examiner

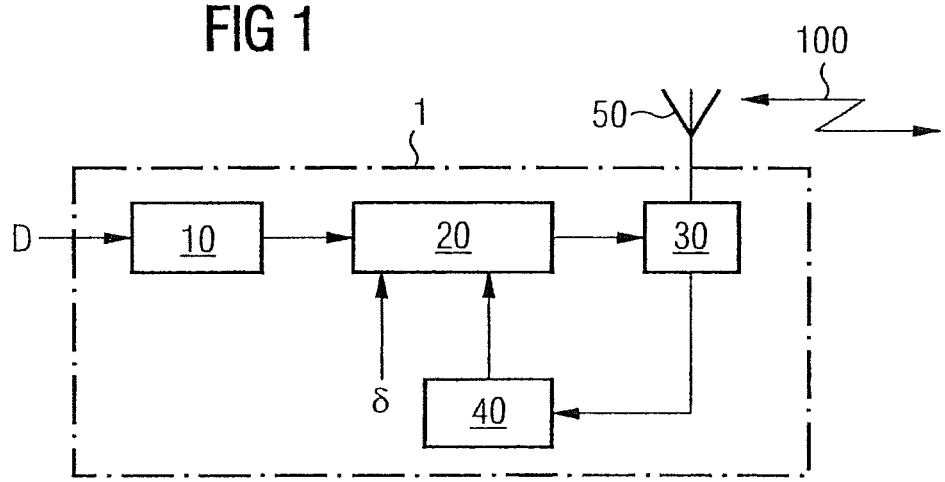
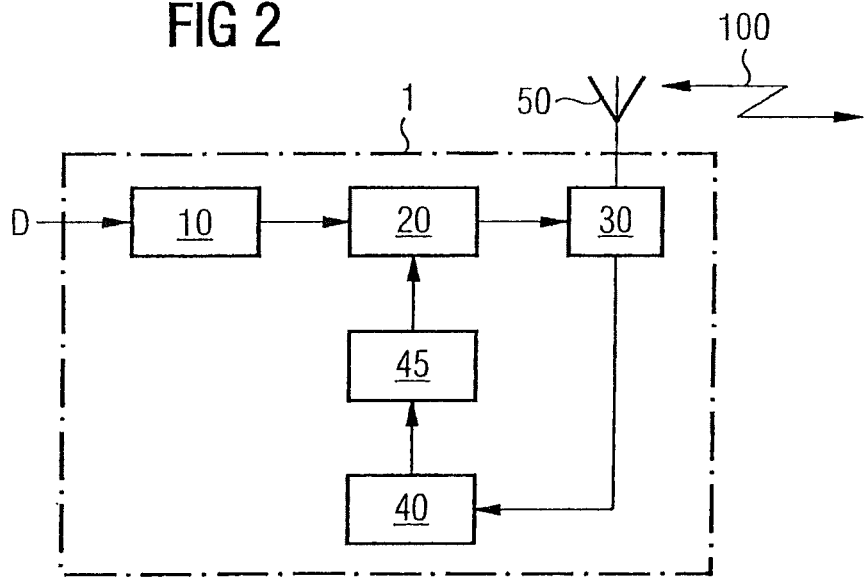

CHANNEL ESTIMATE PREDICTED FROM SEVERAL PREVIOUS CHANNEL ESTIMATES, FOR PRE-EQUALIZATION

CROSS REFERENCE TO RELATED APPLICATIONS

The present application is a continuation application of U.S. patent application Ser. No. 10/380,583, filed Mar. 14, 2003. The invention described and claimed herein is also described in PCT/DE00/03604, filed on Oct. 13, 2000 and DE 19950021.5, filed Oct. 16, 1999. This German Patent Application, whose subject matter is incorporated here by reference, provides a basis for a claim of priority of invention under 35 U.S.C. 119(a)-(d).

BACKGROUND OF THE INVENTION

The present invention relates to a data transmission method, in which an encoded data signal is transmitted in the form of a data stream of data bursts between a transmitter and a receiver, and to a corresponding data transmission apparatus.

Although in principle the present invention can be employed for arbitrary data transmissions, it will be explained along with the problems it seeks to solve with regard to a cellular CDMA (Code Division Multiple Access) data transmission system.

In particular, by means of CDMA, a plurality of data streams can be transmitted simultaneously over a joint frequency band, as known for instance from K. D. Kammeyer, *Nachrichtenübertragung* [Communications Transmission], 2nd Edition, in the series entitled *Informationstechnik*, published by Teubner, Stuttgart, 1996.

In CDMA, a simultaneous transmission of multiple data is effected by encoding the data with codes that are as much as possible uncorrelated, and by superposition of the encoded signals.

In data transmission, among other things, data transmitted in succession or simultaneously interfere with one another; that is, troublesome interference typically occurs in the transmission, in particular intersymbol interference (ISI) from multi-path transmission, and multiple access interference (MAI) by correlated codes.

The following methods are known for interference treatment:
  a rake receiving device, located in the receiver, for treating the ISI, as known from John G. Proakis: "Digital Communications", 3rd Edition, McGraw-Hill, New York, etc., 1995;
  joint detection (JD) in the receiver for treating ISI and MAI, as known from A. Klein, G. K. Kaleh and P. W. Baier: Zero Forcing and Minimum Mean-Square-Error Equalization for Multiuser Detection in Code-Division Multiple Access Channels, IEEE Trans. Vehic. Tech., Vol. 45 (1996), 276-287;
  pre-rake combining in the transmitter for treating ISI, as known from R. Esmailzadeh and M. Nakagawa: "Pre-Rake Diversity Combination for Direct Sequence Spread Spectrum Mobile Communications Systems", IEICE Trans. Comm., Vol. E76-B (1993), 1008-1015; and
  a joint preequalization in the transmitter for treating ISI and MAI.

In this type of data transmission, preequalization in the transmitter is an important interference treatment. Joint preequalization in the transmitter of data signals to be transmitted makes simple data detectors possible. In transmission channels that change quickly, however, preequalization in the transmitter leads to higher error rates than with interference treatment techniques in the receiver. For preequalization, the transmitter must know the pulse response of the transmission channel to be used. The TDD (Time Division Duplex) method makes it possible to achieve this knowledge. Accordingly, the channel is estimated before the data transmission.

The following have proved to be disadvantages of the prior art:
  the rake receiving device does not eliminate MAI;
  JD is very complicated;
  joint preequalization is usable only for channels that change slowly.

SUMMARY OF THE INVENTION

A concept fundamental to the present invention is that a combination of joint preequalization in the transmitter and interference treatment in the receiver is performed. The signals to be transmitted are accordingly jointly preequalized in such a way that for some of the data to be transmitted, interference can be eliminated in the transmitter, and the interference of the other data can be treated in the receiver.

This has the particular advantage of making joint preequalization and interference treatment in the receiver possible in a single system. As a result, a simple receiver with a channel that changes slowly is possible, and at the same time, transmission with a channel that changes quickly is possible.

Another concept fundamental to the present invention is that in an interference treatment in the transmitter, the channel estimate required for the preequalization is predicted from a plurality of prior channel estimates.

This has the particular advantage that the channel estimate better corresponds to the channel at the instant of transmission. This improves the transmission when the transmission channel is changing quickly.

Another concept fundamental to the present invention is that an estimate of the channel pulse response used by the transmitter is performed by the receiver, and the data are detected using this channel estimate.

This also has the particular advantage that the transmission when the transmission channel is changing quickly is improved.

Advantageous refinements of and improvements to the applicable subject of the invention are found in the dependent claims.

In a preferred refinement, the interference treatment is performed in terms of at least one code in the transmitter, and the interference treatment of the data to be transmitted is performed in terms of at least one further code in the receiver.

In a further preferred refinement, the data signal is CMDA-encoded.

In a further preferred refinement, the codes of the data signal to be transmitted are pre-distortion-suppressed jointly, and for some codes, the pulse function is used as a channel estimate.

In a further preferred refinement, the data with a channel estimate performed as a pulse function are detected in the receiver by a rake receiving device.

In a further preferred refinement, in an interference treatment in the transmitter, the channel estimate required for the preequalization is predicted from a plurality of prior channel estimates.

In a further preferred refinement, the channel estimate to be predicted is calculated from the prior channel estimates by linear extrapolation.

In a further preferred refinement, an estimate of the channel pulse response used by the transmitter is performed by the receiver, and the data are detected using this channel estimate.

In a further preferred refinement, the received signal is filtered in accordance with the estimated pulse response, and then the data are detected by means of a rake receiving device.

In a further preferred refinement, the estimated pulse response is used for pseudoinverse detection.

BRIEF DESCRIPTION OF THE DRAWINGS

One exemplary embodiment of the invention is shown in the drawing and will be explain in further detail in the ensuing description.

Shown are:

FIG. 1, an illustration of a transmitter device for explaining a first embodiment of the invention;

FIG. 2, an illustration of a transmitter device for explaining a second embodiment of the invention;

DESCRIPTION OF THE PREFERRED EMBODIMENTS

Figure 3:
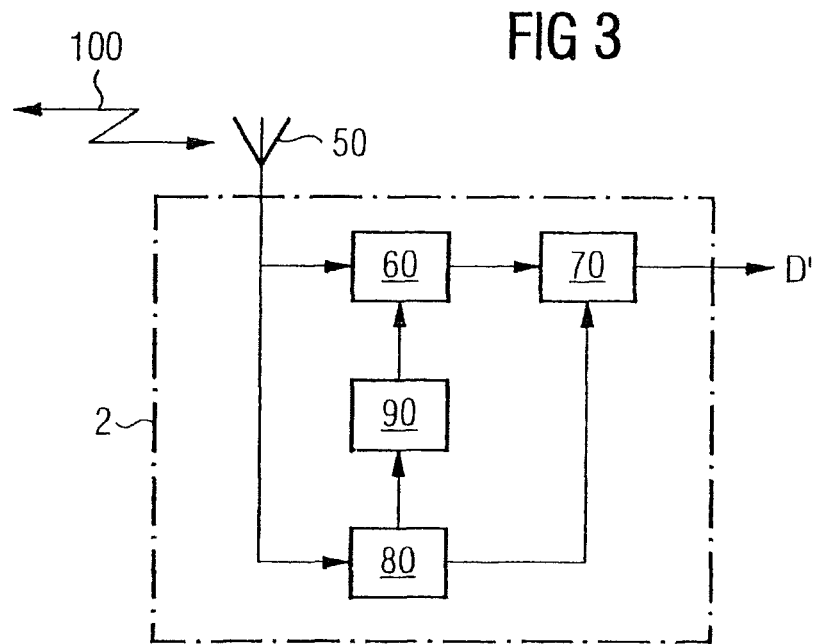
FIG. 3, an illustration of a receiving device for explaining a third embodiment of the invention.

In the drawings, the same reference numerals identify components that are the same or functionally the same.

FIG. 1 illustrates a transmitter device for explaining a first embodiment of the invention.

In FIG. 1, the reference numerals, letters and characters have the following meanings: 1 is a transmitter; D stands for the data to be transmitted; 10 is a modulator; 20 is a preequalizer; 30 is a switch; 40 is a channel estimator; delta stands for pulse functions; 50 is an antenna; and 100 is a TDD radio connection.

In this first embodiment, a combination of joint preequalization and rake reception is employed.

By means of a decision making device in the transmitter, as a function of at least one data transmission parameter, a decision is made as to whether an interference treatment of the data signal to be transmitted is to be performed in the transmitter 1 or in the receiver. The data transmission parameter can for instance be the rate of change of the data channel, or a measure of it.

If for certain data codes the decision is that the interference treatment will be performed in the transmitter 1, then a joint preequalization takes place. In it, channel estimates for connections with interference treatment in the receiver are selected as a pulse function (delta function—pulse response of an ideal channel). The detection of the data with pulse function channel estimate is done by means of a rake receiving device in the receiver.

FIG. 2 is an illustration of a transmitter device for explaining a second embodiment of the invention.

In FIG. 2, in addition to the reference numerals already listed, 45 designates an extrapolator.

For preequalization of the data signals to be transmitted, the pulse response of the current transmission channel in the transmitter 1 must be known. However, the channel can be estimated only a certain length of time before the transmission. The faster the channel changes, the more the estimate deviates from the current channel. This makes the data transmission highly erroneous, for instance when there are high relative speeds between the receiver and the transmitter.

In this second embodiment, the pulse response of the current channel is predicted from a plurality of prior channel estimates, or extrapolated linearly by the extrapolator 45, for instance. This leads to a marked improvement in the transmission when the channel is changing quickly.

The estimation of the channel pulse responses by the preequalizing transmitter 1 is done during time segments when this station is receiving data. The linear extrapolation of the channel pulse responses estimated during the data reception is applied to the transmission time period. The preequalization of the transmitted signal is done in accordance with the extrapolated channel estimate.

Figure 4:
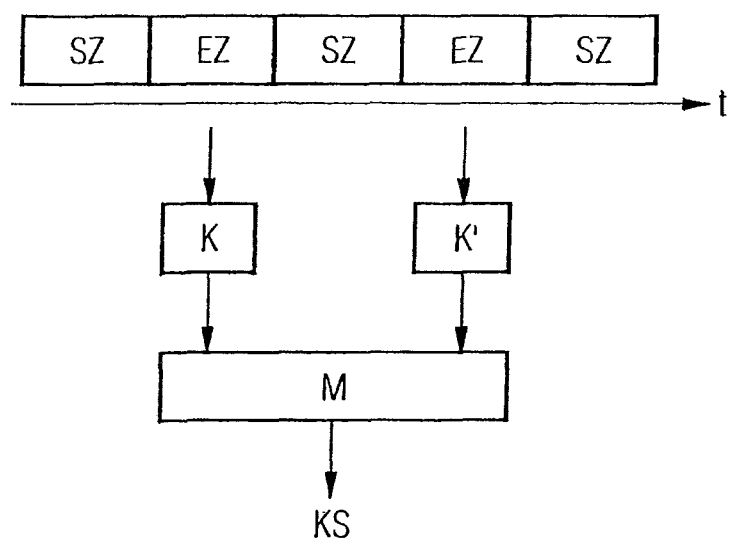
FIG. 4, an illustration of an estimating procedure for the channel estimate used for signal transmission, by means of the receiving device of FIG. 3.

FIG. 3 shows a receiving device for explaining a third embodiment of the invention, and FIG. 4 shows an estimation procedure, for the channel estimate used for transmitting signals, performed by the receiving device of FIG. 3.

In FIGS. 3 and 4, in addition to the reference numerals already listed, 2 is a receiver; 60 is a filter; 70 is a rake receiving device; 80 is a channel estimator; 90 is a device for estimating the channel estimate used in the transmission; D' stands for received data; SZ is a transmission time segment; EZ is a reception time segment; K, K' are channel estimates; M is an averaging operation; KS is a channel estimate for the transmitting time segment, and t is the time.

The channel pulse response used for the preequalization is estimated in the receiver 2, in this embodiment. Using this estimate, the preequalization is taken into account in the receiver, and the data are detected by interference-treating methods.

In a first example of this embodiment, there is one point for multi-point preequalization with rake reception, as illustrated in FIG. 3.

This is a TDD mode, with regularly alternating reception and transmission time segments EZ/SZ, with code division multiple access (CDMA).

In it, an estimate of the channel pulse response used by the transmitter (the preequalizing station) is made by the receiver (rake station). This estimate of the channel is performed during time segments that surround the time segment that is used in the preequalizing transmitting station for the channel estimate (transmitting time segment of the rake station=receiving time segment of the preequalizing station). Next, averaging of the two channel estimates is done.

The filter 60 is used on the received signal, using this estimated pulse response.

Finally, data detection takes place by means of the rake receiving device 70.

In a second example of this embodiment, there is one point for multi-point preequalization with pseudoinverse detection, using the averaged channel estimate instead of the rake detection.

A discrete-time CDMA transmission system with block transmission is assumed. Let $d^{(k)}=(d^{(k)}_1, \ldots, d^{(k)}_M)$, where $k=1, \ldots, K$ is the vector of the M data symbols to be transmitted of the $k^{th}$ user. CDMA encoding and preequalization are linear projections of the data vectors $d^{(k)}$ onto the signal vectors $s^{(k)}$ to be transmitted. These vectors are added together to make the total signal s and are broadcast by the transmitter:

$$s^T = \sum_{k=1}^{K} B^{(k)} \cdot d^{(k)T}$$

in which $d^{(k)T}$ stands for the transposed vector $d^{(k)}$. $B^{(k)}$ is the $(M \cdot Q+W-1) \times M$ projection matrix, containing encoding and preequalization, with the spread factor Q of the CDMA codes and having the length W for the channel estimates used in the preequalization.

The signal s is transmitted to the $k^{th}$ user via the $k^{th}$ transmission channel. Let $h^{(k)}=(h_1^{(k)}, \ldots h_w^{(k)})$ be the pulse response of this channel, and let $$H^{(k)} = \underbrace{\left. \begin{pmatrix} h^{(k)}_1 & 0 & 0 \\ \vdots & \ddots & 0 \\ h^{(k)}_W & \vdots & h^{(k)}_1 \\ 0 & \ddots & \vdots \\ 0 & 0 & h^{(k)}_W \end{pmatrix} \right\}}_{M \cdot Q + W - 1} M \cdot Q + W - 1 + W - 1$$

be the corresponding convolution matrix. If there is additive noise $n^{(k)}$ of the channel, the $k^{th}$ user then receives the signal $$\underline{r}^{(k)T} = \sum_{l=1}^{K} H^{(k)} \cdot B^{(l)} \cdot \underline{d}^{(l)T} + \underline{n}^{(k)}$$

With the reception matrix $R^{(k)}=(B^{(k)H} \cdot H^{(k)H} \cdot H^{(k)} \cdot B^{(k)})^{-1} \cdot B^{(k)H} \cdot H^{(k)H}$, the receiver obtains from the estimates $\hat{d}$ of the transmitted data in accordance with the equation $$\hat{\underline{d}}^{(k)T} = R^{(k)} \cdot \underline{r}^{(k)T}$$

in which $H^{(k)H}$ stands for the conjugated complex, transposed matrix $H^{(k)}$.

Although the present invention has been described above in terms of preferred exemplary embodiments, it is not limited to them but instead can be modified in manifold ways.

The invention can be employed wherever signals to be transmitted have to be preequalized and at the same time connections over quickly changing channels are required, especially in TDD radio transmission systems with preequalization.

The invention claimed is:

1. A data transmission apparatus comprising a receiving device and a transmitting device,
    wherein the receiving device comprises:
        a channel estimator
        a filter responsive to an input from the channel estimator and
        a rake receiver responsive to an input from the channel estimator, and
    wherein the transmitting device comprises
        a modulator,
        a preequalizer
        a channel estimator, and
        a decision making device, the decision making device being arranged to make a decision as to whether an interference treatment of a data signal to be transmitted is to be performed in the transmitter or not in response to a data transmission parameter selected from a rate of change of a channel estimate and a measure of the channel estimate,
    the receiving device being arranged to provide the channel estimate to the transmitting device.

2. The apparatus of claim 1, wherein the apparatus is a cellular code division multiple access system.

3. The apparatus of claim 1, wherein the receiving device and the transmitting device are arranged to operate in a time division duplex mode.

4. The apparatus of claim 1, wherein the channel estimate is a pulse function channel estimate.

5. The apparatus of claim 2, wherein the interference treatment on the data to be transmitted is performed on one code and the receiving device is arranged to perform interference treatment on received data of at least one further code.

6. The apparatus of claim 1, wherein the preequalizer is arranged to perform interference treatment using an extrapolated channel estimate derived from multiple channel pulse response estimates obtained over a period of time.

7. A transmitter being arranged to perform the steps of:
    transmitting an encoded data signal in form of a data stream of data bursts;
    making a decision in a decision making device as a function of at least one data transmission parameter as to whether an interference treatment of the data signal to be transmitted will be performed based on prior channel estimates;
    in the event that interference treatment will be performed further performing the interference treatment on at least one coded channel; and
    using as the at least one data transmission parameter on which the decision is made the at least one data transmission parameter which is a rate of change of an estimate of a pulse response of the data channel.

8. The transmitter as defined in claim 7, wherein said transmitter is arranged to transmit the data signal as a CDMA-encoded data signal.

9. The transmitter as defined in claim 8, wherein said transmitter is arranged to perform pre-distortion of codes of the data signal to be transmitted; and being further arranged to use for some codes a Dirac-pulse function as a channel estimate.

10. The transmitter as defined in claim 9, wherein said transmitter is arranged to predict the channel estimate for the pre-equalization from a plurality of prior channel estimates.

11. The transmitter as defined in claim 10, wherein said transmitter is arranged to calculate the channel estimate to be predicted from the prior channel estimates by linear extrapolation.

* * * * *